United States Patent [19]
Joe et al.

[11] Patent Number: 6,044,334
[45] Date of Patent: Mar. 28, 2000

[54] METHOD FOR CALCULATING AN AMOUNT AND DETERMINING A POSITION OF AN ECCENTRIC MASS OF A ROTARY HEAD APPARATUS OF A FIXED SHAFT TYPE AND APPARATUS FOR CALCULATING AND DETERMINING THE SAME

[75] Inventors: Yeo-Uk Joe; Yun-Won Yang, both of Seoul, Rep. of Korea

[73] Assignee: Daewoo Electronics Co. Ltd., Seoul, Rep. of Korea

[21] Appl. No.: 09/000,718

[22] Filed: Dec. 30, 1997

[30] Foreign Application Priority Data

| Dec. 30, 1996 | [KR] | Rep. of Korea | 96-76491 |
| Dec. 30, 1996 | [KR] | Rep. of Korea | 96-76497 |
| Dec. 30, 1996 | [KR] | Rep. of Korea | 96-76498 |
| Dec. 30, 1996 | [KR] | Rep. of Korea | 96-76499 |
| Dec. 30, 1996 | [KR] | Rep. of Korea | 96-76500 |

[51] Int. Cl.$^7$ ............................................. G01M 1/22
[52] U.S. Cl. ............................................. 702/147; 702/150
[58] Field of Search ............................... 73/65.01, 65.09, 73/66, 460, 462, 468–470, 655, 660; 702/147, 150–190

[56] References Cited

U.S. PATENT DOCUMENTS

| 4,060,707 | 11/1977 | Olsson et al. | 72/80 |
| 4,098,127 | 7/1978 | Shiga et al. | 73/462 |
| 4,357,832 | 11/1982 | Blackburn et al. | 73/462 |
| 4,480,472 | 11/1984 | Wood | 73/462 |
| 4,776,215 | 10/1988 | Currchod | 73/462 |
| 4,823,218 | 4/1989 | Ibe . | |
| 4,958,290 | 9/1990 | Kendall et al. | 73/460 |
| 5,051,851 | 9/1991 | Sakurai . | |
| 5,051,852 | 9/1991 | Kohno . | |
| 5,293,040 | 3/1994 | Watanabe et al. | 73/655 |
| 5,313,347 | 5/1994 | Mitsuhashi . | |
| 5,627,762 | 5/1997 | Cameron et al. | 73/462 |

FOREIGN PATENT DOCUMENTS

| 593 231 | 10/1947 | United Kingdom . |
| 2 029 967 | 3/1980 | United Kingdom . |
| 2 273 810 | 6/1994 | United Kingdom . |

*Primary Examiner*—Marc S. Hoff
*Assistant Examiner*—Craig Steven Miller
*Attorney, Agent, or Firm*—Pillsbury Madison & Sutro LLP

[57] ABSTRACT

A method for calculating an amount and determining a position of an eccentric mass existing in a rotary head apparatus of a fixed shaft type, and to an apparatus for calculating and determining the same is disclosed. The method for calculating an amount and determining a position of the eccentric mass of the rotary head apparatus of the fixed shaft type and the apparatus for calculating and determining the same, are very accurate and credible. Accordingly, the rotational vibration of the head apparatus can be largely reduced through a balancing utilizing the eccentric mass calculated by and determined by the above-mentioned method and apparatus.

11 Claims, 10 Drawing Sheets

---- : DEFLECTION CURVE OF A SHAFT

—— : PULSE OF PERIOD OF ROTATION OF
       AN UPPER DRUM

FIG. 10

METHOD FOR CALCULATING AN AMOUNT AND DETERMINING A POSITION OF AN ECCENTRIC MASS OF A ROTARY HEAD APPARATUS OF A FIXED SHAFT TYPE AND APPARATUS FOR CALCULATING AND DETERMINING THE SAME

BACKGROUND OF THE INVENTION

1. Field of the Invention

The present invention relates to a method for calculating an amount and determining a position of an eccentric mass existing in a rotary head apparatus of a fixed shaft type, and to an apparatus for calculating and determining the same.

2. Description of the Prior Art

Every revolving body has an eccentric mass, and this eccentric mass generates a rotational vibration. A head apparatus which is installed in a video cassette recorder (VCR) reproduces an information which is recorded on a tape or records some information on a tape while rotating. Since the head apparatus which is installed in the VCR also is a revolving body, it has an eccentric mass generates a rotational vibration. The rotational vibration of the head apparatus of the VCR is an important factor which deteriorates the quality of the reproducing image or the recording image of the tape.

U.S. Pat. No. 5,051,852 issued to Takashi Kohno, et al. discloses a mechanism for balancing a rotary magnetic head apparatus. This will be explained with reference to the accompanied FIG. 1.

Figure 1:
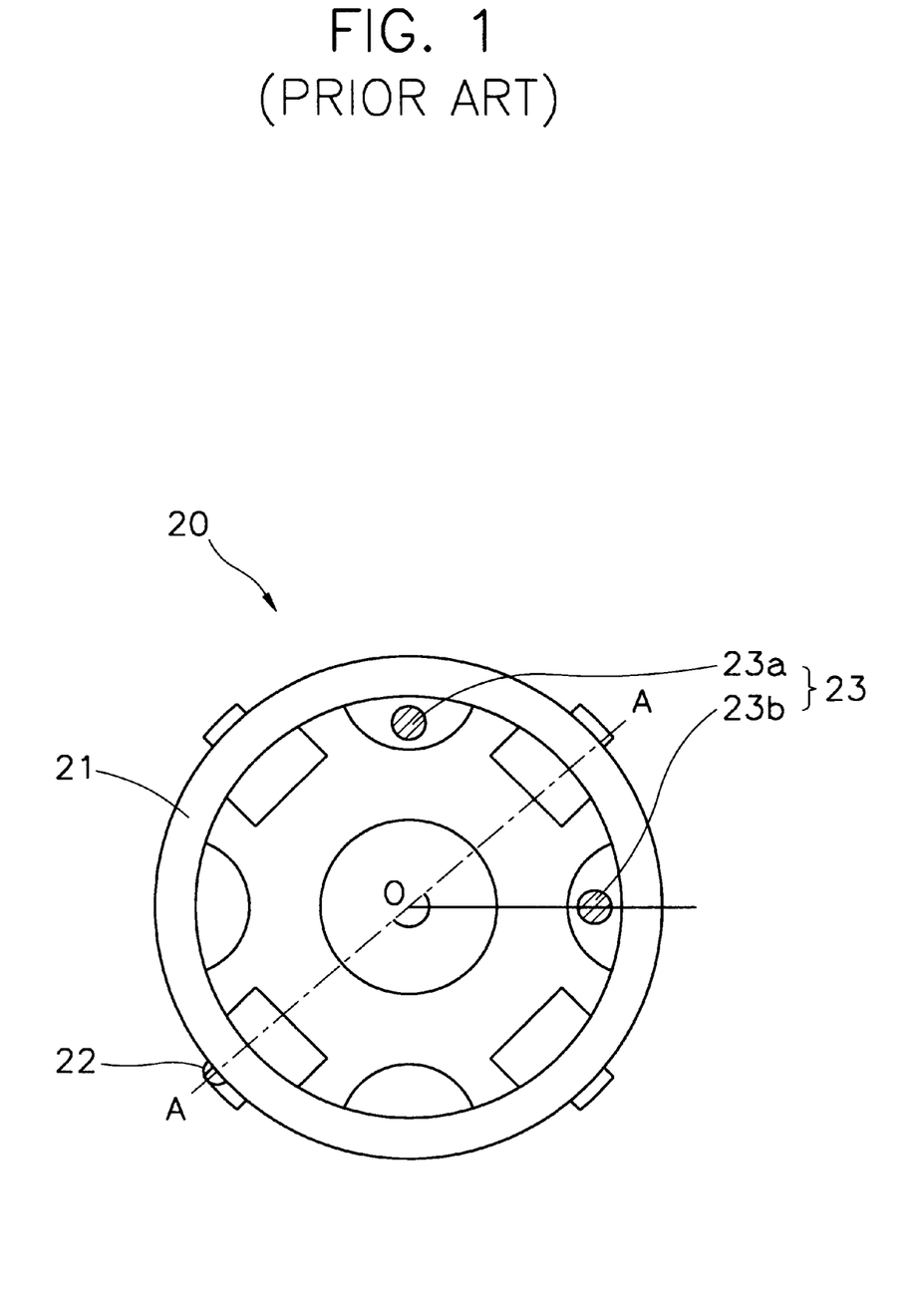
FIG. 1 is illustrated for showing the balancing of the conventional rotary shaft type rotary head apparatus.

FIG. 1 is a conventional head apparatus 20 having a balancer. As illustrated in this drawing, it is assumed that an unbalancer 22 having a mass of W1 is disposed on a certain portion of a rotary cylinder 21. A pair of balancers 23 are attached on the other portion of rotary cylinder 21, where the unbalancer 22 is disposed. At this time, the pair of balancers 23a and 23b are attached so as to keep symmetry with respect to an extended line A—A which is obtained by connecting unbalancer 22 and the center (O) of rotary cylinder 21 in order to maintain a balance. Also, the apparatus of Takashi Kohno includes a correcting plates which are respectively installed on the upper and lower portions of the rotary cylinder, and a motor rotor. The balancers are attached on the correcting plates according to the same method described above for balancing.

However, in the mechanism for balancing the rotary magnetic head apparatus of Takashi Kohno, et al., the problem exists that the amount of the eccentric mass of the head apparatus, and the position of the eccentric mass of the head apparatus are not disclosed.

SUMMARY OF THE INVENTION

Accordingly, it is an object of the present invention considering the above-mentioned problem, to provide a method for accurately calculating an amount of an eccentric mass of a rotary head apparatus, and to provide an apparatus for calculating the same.

Another object of the present invention considering the above-mentioned problem, is to provide a method for accurately determining a position of an eccentric mass of a rotary head apparatus, and to provide an apparatus for determining the same.

To accomplish the object, there is provided in the present invention a method for calculating an amount of an eccentric mass of a rotary head apparatus of a fixed shaft type having a drum including a fixed lower drum and a rotary upper drum, a shaft of which one end portion is fixed to said lower drum and of which other end portion is extended toward an outside of said upper drum, and a pair of first and second bearings which are installed on said shaft, support said upper drum, and rotate with said upper drum, comprising the steps of: rotating said upper drum at a required velocity; measuring a deflection of said shaft by said eccentric mass existing in said upper drum by means of an irradiation of a laser onto said extended portion of said shaft toward said outside of said upper drum and a reflection of said irradiated laser; and calculating said eccentric mass existing in said upper drum utilizing said measured deflection of said shaft.

There also is provided in the present invention, an apparatus for calculating an amount of an eccentric mass of a rotary head apparatus of a fixed shaft type having a drum including a fixed lower drum and a rotary upper drum, a shaft of which one end portion is fixed to said lower drum and of which other end portion is extended toward an outside of said upper drum, and a pair of first and second bearings which are installed on said shaft, support said upper drum and rotate with said upper drum, said apparatus comprising: a means for rotating said upper drum at a required velocity; a means for measuring a deflection of said shaft by said eccentric mass existing in said upper drum by means of an irradiation of a laser onto said upper drum and a reflection of said irradiated laser; and a means for calculating said eccentric mass existing in said upper drum utilizing said measured deflection of said shaft.

Another object of the present invention is accomplished by a method for determining a position of an eccentric mass of a rotary head apparatus of a fixed shaft type having a drum including a fixed lower drum and a rotary upper drum, a shaft of which one end portion is fixed to said lower drum and of which other end portion is extended toward an outside of said upper drum, a pair of first and second bearings which are installed on said shaft, support said upper drum and rotate with said upper drum, and a sensing device which is disposed in said upper drum, and senses a period of said rotation of said upper drum, comprising the steps of: rotating said upper drum at a required velocity; measuring a deflection of said shaft by said eccentric mass existing in said upper drum by means of an irradiation of a laser onto said extended portion of said shaft toward said outside of said upper drum and a reflection of said irradiated laser; and measuring a period of rotation of said upper drum; calculating said eccentric mass existing in said upper drum utilizing said measured deflection of said shaft; and determining a position of said eccentric mass existing in said upper drum utilizing said measured deflection of said shaft and said measured period of rotation of said upper drum.

There also is provided in the present invention, an apparatus for determining a position of an eccentric mass of a rotary head apparatus of a fixed shaft type having a drum including a fixed lower drum and a rotary upper drum, a shaft of which one end portion is fixed to said lower drum and of which other end portion is extended toward an outside of said upper drum, a pair of first and second bearings which are installed on said shaft, support said upper drum, and rotate with said upper drum, and a sensing device which is disposed in said upper drum, and senses a period of said rotation of said upper drum, said apparatus comprising: a means for rotating said upper drum at a required velocity; a means for measuring a deflection of said shaft by said eccentric mass existing in said upper drum by means of an irradiation of a laser onto said upper drum and a reflection of said irradiated laser; a means for calculating said eccentric mass existing in said upper drum utilizing said measured deflection of said shaft; a means for determining a position of said eccentric mass existing in said upper drum utilizing said measured deflection of said shaft and said measured period of rotation of said upper drum.

The method for calculating an amount and determining a position of the eccentric mass of the rotary head apparatus of the fixed shaft type and the apparatus for calculating and determining the same, are very accurate and credible. Accordingly, the rotational vibration of the head apparatus can be largely reduced through a balancing utilizing the eccentric mass calculated by and determined by the above-mentioned method and apparatus.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Hereinafter, the method and apparatus for calculating an amount and determining a position of an eccentric mass of the fixed shaft type rotary head apparatus according to a preferred embodiment of the present invention will be explained in more detail with reference to the accompanying drawings.

Figure 2:
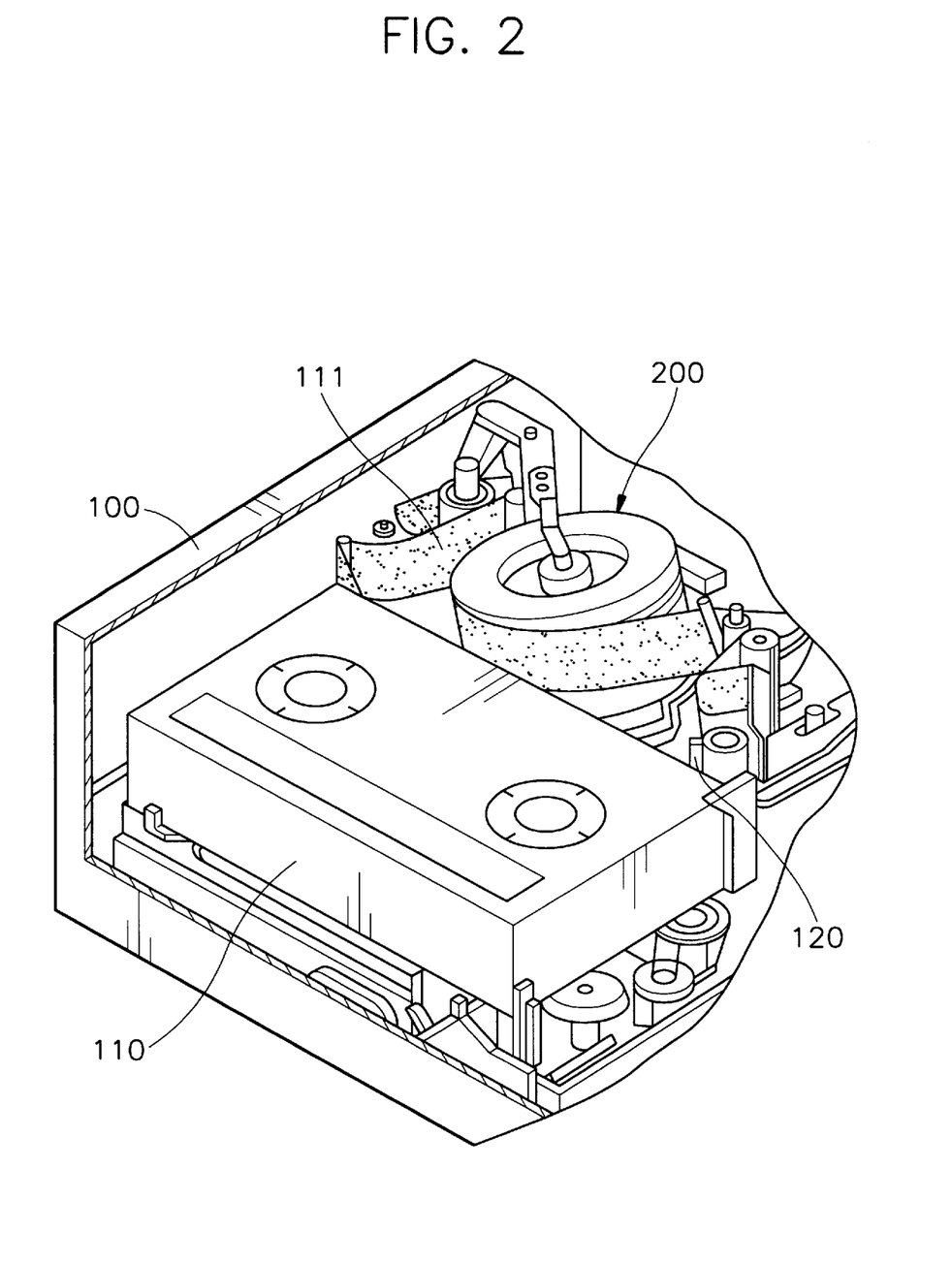
FIG. 2 is a perspective view of a video cassette recorder for showing a fixed shaft type rotary head apparatus according to an embodiment of the present invention.

FIG. 2 is a perspective view of a video cassette recorder for showing a fixed shaft type rotary head apparatus according to an embodiment of the present invention. The constituting elements are as follows.

A cassette 110 is inserted into a case 100 which is provided with a rotary head apparatus 200. A magnetic tape 111 of cassette 110 moves by a capstan 120. The information recorded in magnetic tape 111 of cassette 110 is reproduced by rotating head apparatus 200.

Figure 3:
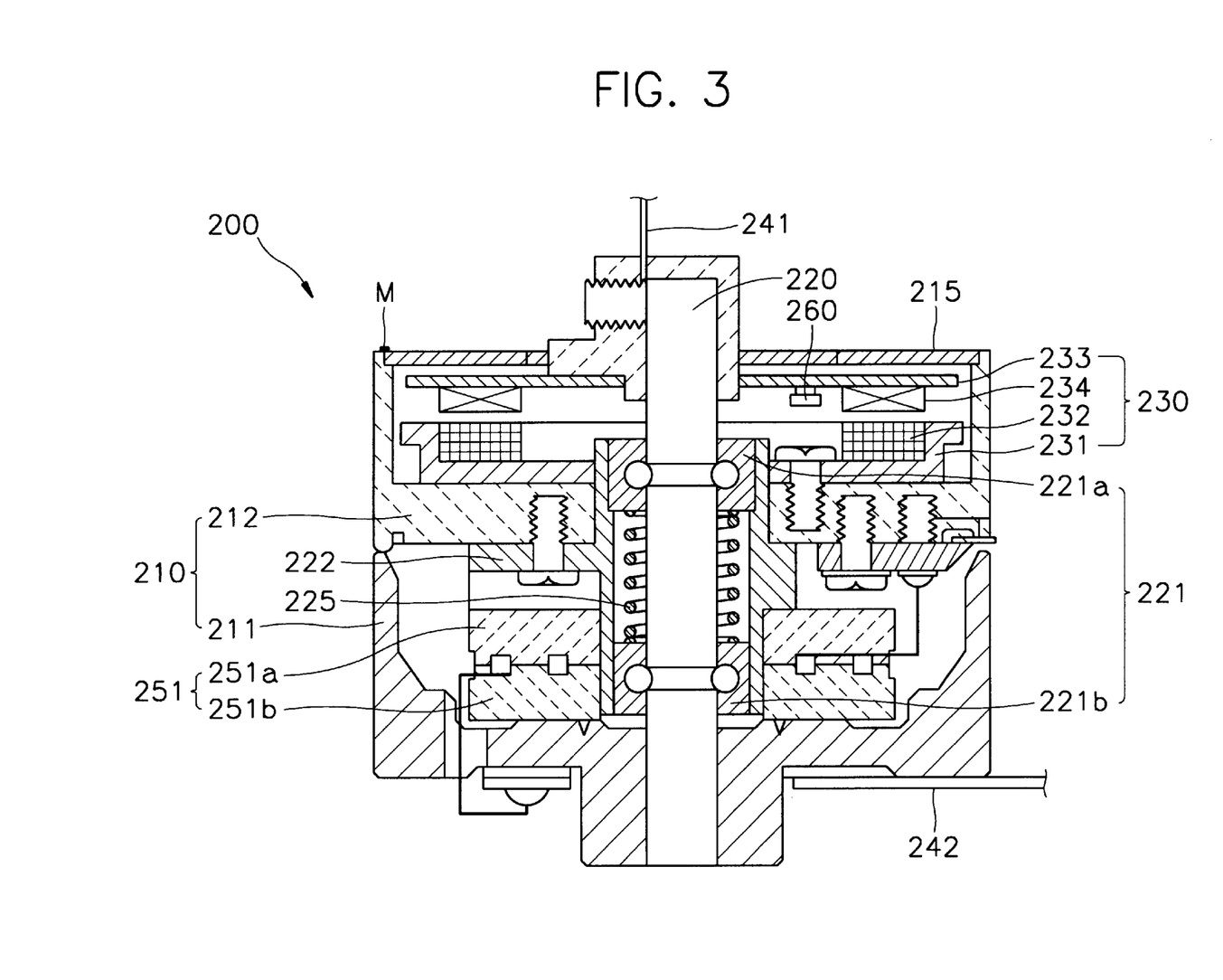
FIG. 3 is a cross-sectional view of the head apparatus illustrated in FIG. 2.

Rotary head apparatus 200 according to this embodiment is a fixed shaft type head apparatus. This will be explained with reference to FIG. 3. FIG. 3 is a cross-sectional view of the head apparatus illustrated in FIG. 2.

As illustrated in FIG. 3, head apparatus 200 has a drum 210 installed in case 100 (refer to FIG. 2). Drum 210 includes a lower drum 211 which is fixed to case 100 and an upper drum 212 which rotates at an upper portion of lower drum 211. Through upper drum 212 and lower drum 211, a shaft 220 passes. Shaft 220 is fixed at lower drum 211. Lower drum 211 and shaft 220 do not rotate but are fixed. At the outer periphery of shaft 220, pair of first and second bearings 221a and 221b are rotatably installed, and through an outer periphery of bearing 221, a rotary housing 222 is inserted with pressure. Rotary housing 222 and a lower surface of the upper drum 212 are brought into meshing engagement.

In upper drum 212, a motor 230 is provided. Motor 230 includes a magnetic housing 231 which is combined with an the inner lower portion of upper drum 212, includes a magnet 232 which is meshed with magnetic housing, 231 and includes a stator 233 provided on the upper portion of magnet 232. Around stator 233, a coil is wound. Magnetic housing 231 is combined with rotary housing 222 and rotates with rotary housing 222 in the same manner. Stator 233 is combined with shaft 220 and does not rotate. That is, bearing 221, rotary housing 222, magnetic housing 231 and magnet 232 are connected and rotate in the same manner.

At the upper portion of upper drum 212, a back yoke 215 is provided for preventing a leakage of a magnetic force generated from stator 233 toward the outside of upper drum 211. In addition, a rotary transformer 251a is installed at rotary housing 222 and a fixed transformer 251b facing rotary transformer 251a is installed in lower drum 211. Accordingly, rotary transformer 251a also rotates in the same manner with rotary housing 222.

When a current is supplied to coil 234 through an input printed circuit board 241 which is extended to the upper portion of shaft 220, magnet 232 starts to rotate through the interaction of the current passing through coil 234 and magnet 232. Then, magnetic housing 231, upper drum 212, rotary housing 222, bearing 221 and rotary transformer 251a also rotate in the same manner. At this time, magnetic tape 111 (refer to FIG. 2) moves by capstan 120 and the information recorded on magnetic tape 111 is read and reproduced through transformer 251 and an output printed circuit board 242 which is extended to an outer portion of lower drum 211. Unexplained designated numeral 225 is a spring for supporting the bearing.

The head apparatus having the above-mentioned constitution according to this embodiment is a fixed shaft type digital head apparatus. The digital head apparatus is smaller than a rotary shaft type analog head apparatus and rotates at about 9,000 rpm. Since the digital head apparatus is smaller than the analog head apparatus and rotates at high speed, dynamic characteristics of the digital head apparatus is very important.

In order to interpret the dynamic characteristic of the digital head apparatus, the following items are supposed. First, the shaft does not rotate but is fixed. Therefore, the deflecting phenomena of the shaft is the largest dynamic characteristic of the head apparatus. That is, the action by the eccentric mass of the upper drum assembly, to which various elements are combined, appears through the deflection of the shaft. Second, the shaft is fixed, the resonance frequency is high, the exciting force is weak, and the twist vibration of the shaft is not considered.

In more detail, if the entire mass of the upper drum assembly exists on the shaft, the deflection of the shaft is generated only by the centrifugal force of the eccentric mass of the upper drum assembly. This assumption is introduced to simplify the determination of the unbalance by the eccentric mass and the measure of the eccentric mass and to make it possible to quantitatively obtain the position of the eccentric mass. Under this assumption, the method and the apparatus for calculating the amount of the eccentric mass of the head apparatus will be explained and the accuracy of this method will be verified hereinafter.

First, the method for calculating the amount of the eccentric mass of the head apparatus according to this embodiment will be explained.

Figure 4:
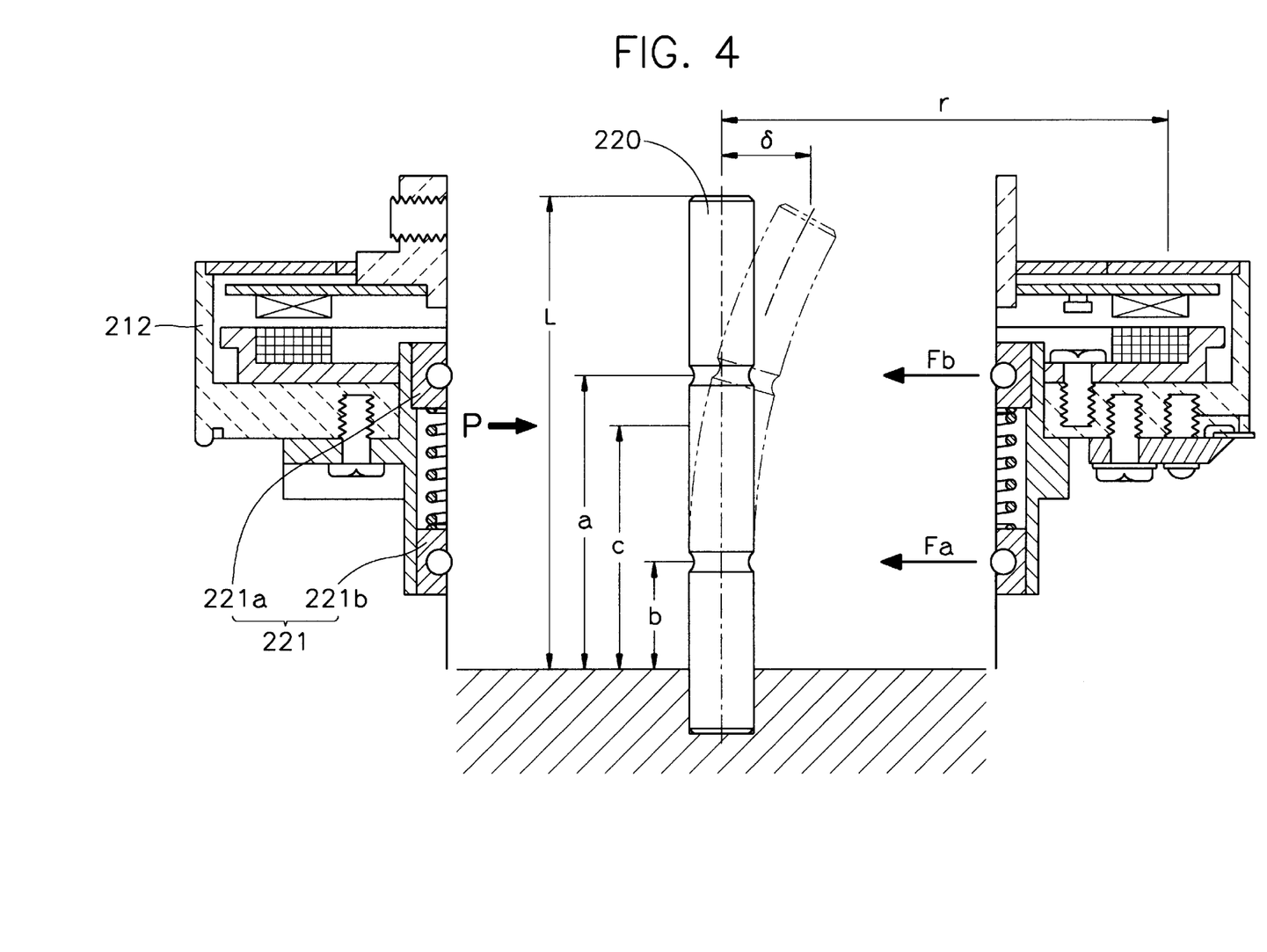
FIG. 4 illustrates the deflection of the shaft of the head apparatus illustrated in FIG. 3 by the eccentric mass of an upper drum assembly and the reaction force of a bearing acting on the shaft.

FIG. 4 will be explained. FIG. 4 illustrates the deflection of the shaft of the head apparatus illustrated in FIG. 3 by the eccentric mass of the upper drum assembly, and the reaction force of the bearing acting on the shaft.

As illustrated in this drawing, when m=eccentric mass, r=length from the center of the shaft to the eccentric mass and ω=angular velocity of the upper drum assembly, shaft 220 is deflected by the centrifugal force of the following equation.

$$P = m \cdot r \cdot \omega^2 \quad \text{- - -} \quad (1)$$

At this time, when L is the length from the fixed end of the shaft to the free end and c=linear distance from the fixed end of the shaft to the eccentric mass in the upper drum assembly (= distance from the shaft portion where the centrifugal force acts to the fixed end of the shaft), the deflection of the shaft is obtained by the following equation.

$$\delta = (P \cdot c^2 / 6 \cdot E \cdot I)(3 \cdot L - c) \quad \text{- - -} \quad (2)$$

Wherein, δ=deflection, E=Young's modulus and I=second moment of inertia.

Further, when the reaction forces of first and second bearings 221a and 221b acted on shaft 220 are respectively Fa and Fb, P=(Fa+Fb) - - - (3) because ΣF=0.

Since shaft 220 is fixed, moment of inertia acts on shaft 220. And the moment of inertia at position b is as follows.

Fa·(a−b)=P·(c−b) - - - (4) because ΣM=0.

Wherein, a=distance from the fixed end of the shaft to the first bearing and b=distance from the fixed end of the shaft to the second bearing.

Then, Fa=P·(c−b)/(a−b) - - - (5) from equation (4), and Fb=P·(a−c)/(a−b) - - - (6), if equation (5) is substituted for equation (3).

At this time, the defection of the shaft by the centrifugal force P and the deflection of the shaft by the reaction forces Fa and Fb of the bearing acting on the shaft, are the same. Therefore, through equation (2), the following equation can be obtained.

$$\delta = (Fa \cdot a^2 / 6 \cdot E \cdot I)(3 \cdot L - a) + (Fb \cdot b^2 / 6 \cdot E \cdot I)(3 \cdot L - b) = [(P/(6 \cdot E \cdot I \cdot (a-b))] \times [a^2 \cdot (c-b) \cdot (3L-a) + b^2 \cdot (a-c) \cdot (3-b)] \quad \text{- - -} \quad (7)$$

Next, the calculated deflection of the shaft obtained by equation (7) and the measured deflection will be compared.

The optional constants and the determined constants contained in equation (7) are set as in Table 1.

TABLE 1

| constant | value |
| --- | --- |
| a | 12.1 mm |
| b | 5.2 mm |
| c | 9.27 mm |
| L | 17.87 mm |
| m | 0.203 g |
| r | 6.2 mm |
| E | 21,200 Kgf/mm² |
| I(πd²/64) | 1.3737 mm |

Figure 5:
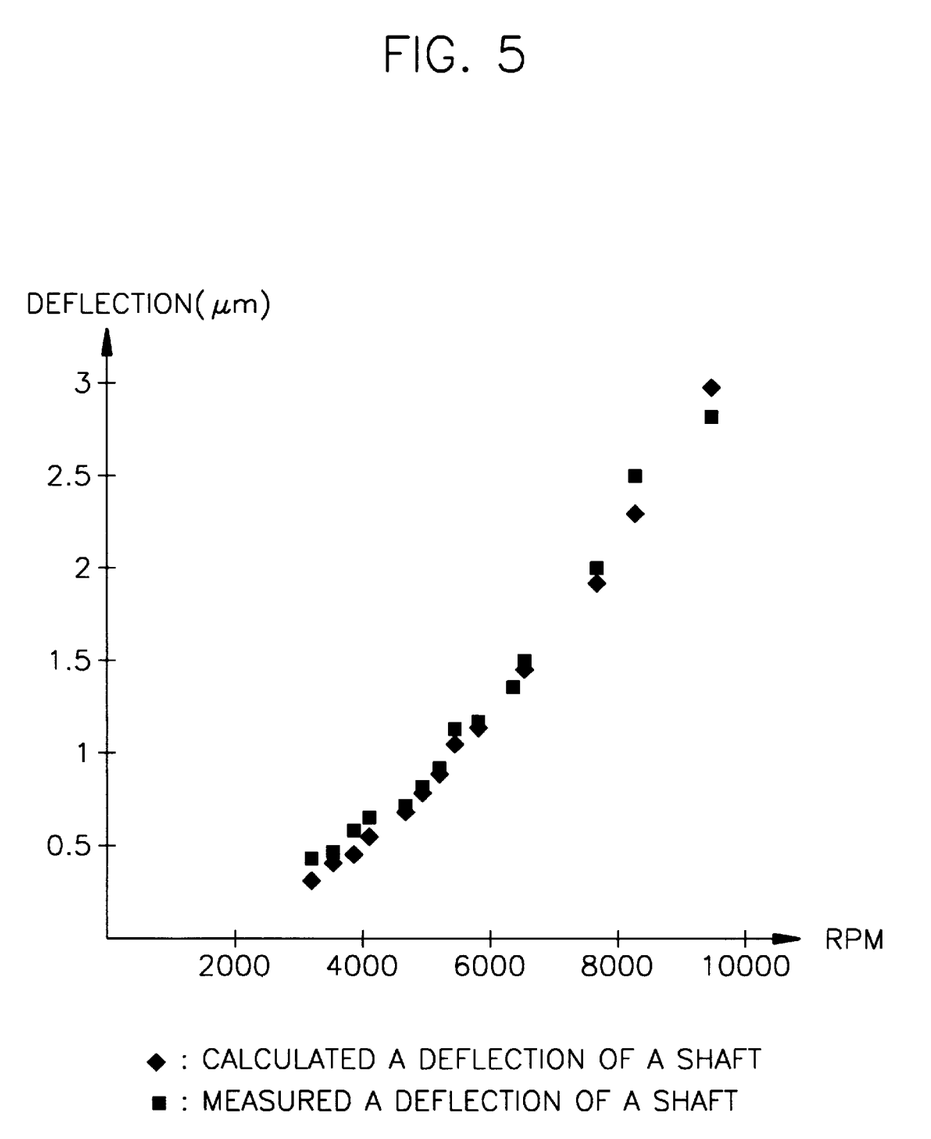
FIG. 5 is a comparison graph of the calculated deflection with respect to the measured deflection of the head apparatus illustrated in FIG. 3.

FIG. 5 illustrates a comparison graph of the calculated deflection obtained by substituting the given values in Table 1 for equation (7) with respect to the measured deflection under the same condition.

As illustrated in FIG. 5, the calculated deflection and the measured deflection are almost the same when the conditions are the same. A comparison of the calculated deflection which is the ideal deflection with the measured deflection, is carried out for the following reason. The measured deflection value is utilized in the method for calculating the eccentric mass according to this embodiment. However, if the measured deflection is not credible, this value cannot be utilized. Therefore, the calculated deflection and the measured deflection are compared and verified.

In this embodiment, a balancer is attached to the end portion of back yoke 215 which is provided on the upper portion of the upper drum, for an easy balancing. It is assumed that the eccentric mass is disposed at the end portion of back yoke 215. Then, from equation (7), $\delta = (m \cdot r \cdot \omega^2 (=P)/6 \cdot E \cdot I \cdot (a-b)) \times [a^2 \cdot (c-b) \cdot (3 \cdot L-a) + b^2 \cdot (a-c) \cdot (3 \cdot L-b)]$, only the eccentric mass m existing at the upper end portion of the yoke is variable, since δ can be measured, r is the distance from the center of the shaft to the end portion of the back yoke and c is the distance from the fixed end of the shaft to the upper surface of the yoke. Therefore, the amount of the eccentric mass m can be calculated.

A balancer (M; refer to FIG. 3) having the same amount as the calculated amount of the eccentric mass obtained as above, is attached at an optional end portion of back yoke 215 through trial and error in order to balance the head apparatus.

Hereinafter, the method for determining a position of an eccentric mass of the fixed shaft type rotary head apparatus according to a preferred embodiment of the present invention, and the apparatus for calculating an amount and determining a position of an eccentric mass of the fixed shaft type rotary head apparatus according to a preferred embodiment of the present will be explained.

Figure 6:
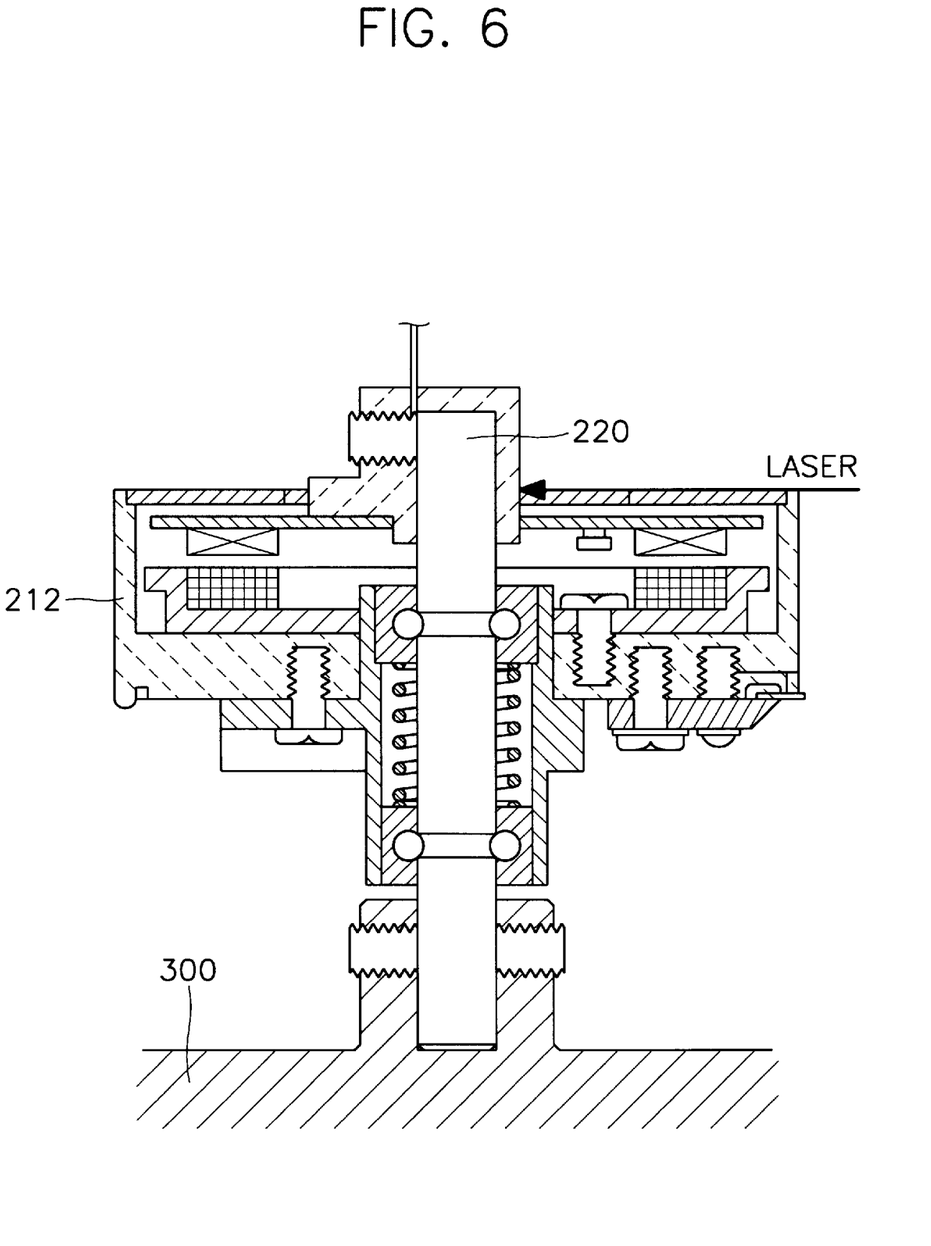
FIG. 6 illustrates an irradiating method of a laser onto the shaft, for measuring the deflection of the shaft of the head apparatus illustrated in FIG. 3.
Figure 7:
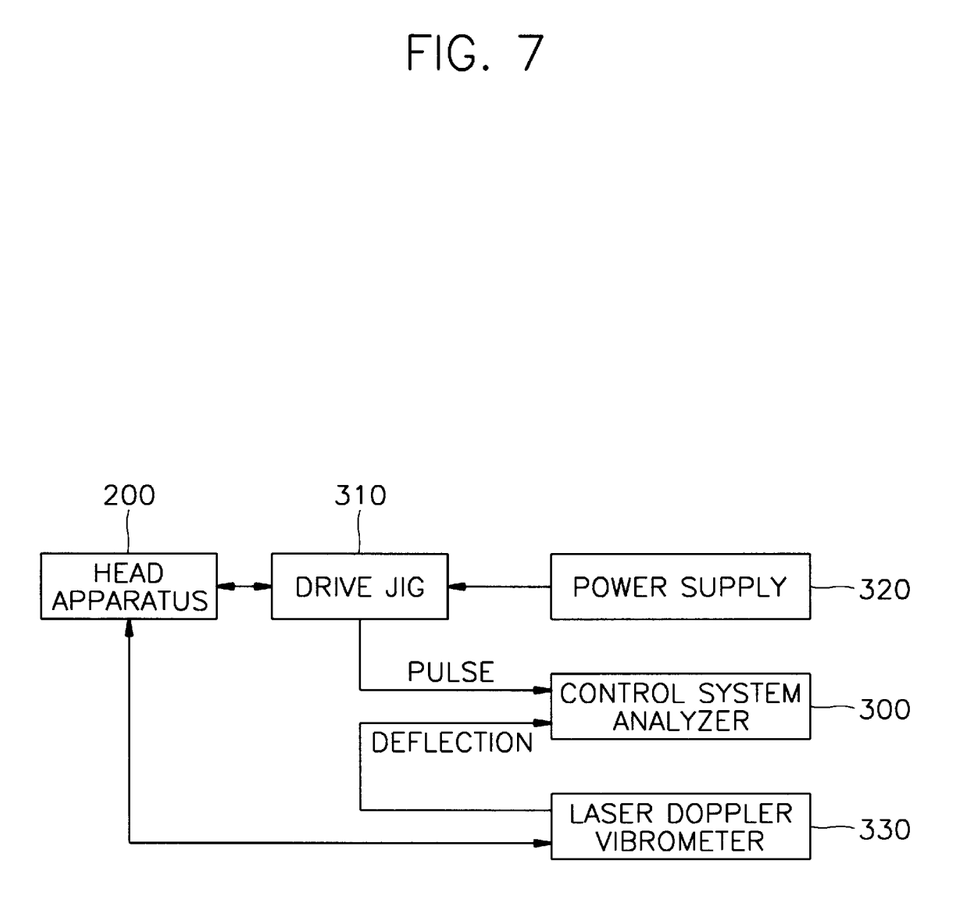
FIG. 7 is a controlling block diagram for measuring the deflection of the shaft of the head apparatus illustrated in FIG. 3

The apparatus for measuring the deflection will be explained with reference to FIGS. 6 & 7. FIG. 6 illustrates a method for measuring the deflection of the shaft of the head apparatus illustrated in FIG. 3. FIG. 7 is a controlling block diagram for measuring the deflection of the shaft of the head apparatus illustrated in FIG. 3.

As illustrated in these drawings, the lower end portion of shaft 220 is fixed to a support 300 and the upper drum assembly is coupled to the upper end portion of shaft 220. The deflection of shaft 220 is measured by irradiating a laser around the protruding portion of shaft 220 toward the upper portion of upper drum 212. The irradiation of the laser onto the shaft 220 is carried out because the unevenness of the outer periphery of upper drum 212 can also be measured.

The controlling block diagram will be explained. A drive jig 310 for rotating the head apparatus 200, a power supply 320 for supplying a power to the drive jig 310, and a laser doppler vibrometer 330 for irradiating the laser onto the head apparatus 200 are provided. In addition, a control system analyzer 300 is provided for receiving and analyzing signals from the drive jig 310 and the laser doppler vibrometer 330.

When a current is supplied to the drive jig 310 from power supply 320, the drive jig 310 rotates head apparatus 200 at a required rotating velocity. More particularly, the drive jig 310 rotates the upper drum assembly 212. And when the laser is irradiated onto head apparatus 200, the maximum deflection and the minimum deflection are received by laser doppler vibrometer 330 and inputted to control system analyzer 300. A sensing device 260 (referred to FIG. 3) for sensing a period per rotation of the magnet 232 and for transmitting the period per rotation of magnet 232 to the drive jig 310, is installed in the upper drum 212. As above described, the upper drum 212 is rotated by the magnet 232 and rotates in the same manner as the magnet 232. The drive jig 310 transmits a pulse signal which occurs at each and every rotation of the upper drum 212 to the control system analyzer 300.

Figure 8:
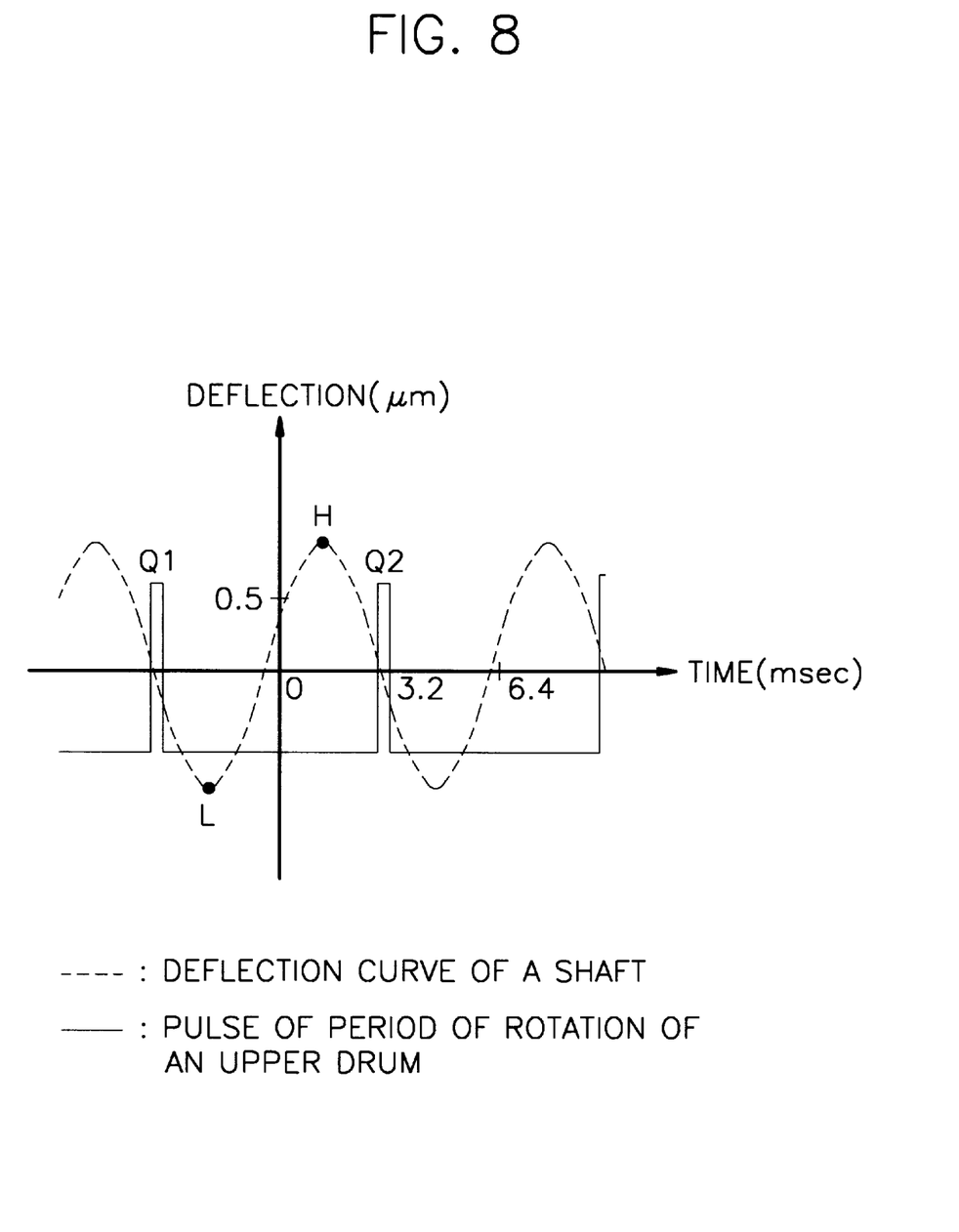
FIG. 8 is a graph for showing a deflection of the shaft according to one rotation period of an upper drum assembly which is not balanced.

The pulse signal which is transmitted from the drive jig 310 to the control system analyzer 300 and a sine wave which is transmitted from the laser vibrometer doppler 330 are illustrated in FIG. 8. FIG. 8 is a graph for showing a deflection of the shaft according to one rotation period of the upper drum assembly which is not balanced.

A solid line is the pulse signal of the rotation per period of the upper drum 212, and an angle between the first point Q1 and the second point Q2 is 360°. So, a maximum deflection H and a minimum deflection L of the shaft 220 exist between the first point Q1 and the second point Q2. The angle between the first point Q1 and the minimum deflection L or between the second point Q2 and the maximum deflection H can be calculated.

Calculated angle is about 86.9° in FIG. 8. The calculated angle is the angle between a first position of the eccentric mass of the upper drum 212 and a second position of the magnet 232 which is sensed by the sensing device 260. When a balancer M(refer to FIG. 3) is attached to a third position which is opposite to the second position, the head apparatus 200 is balanced.

Figure 9:
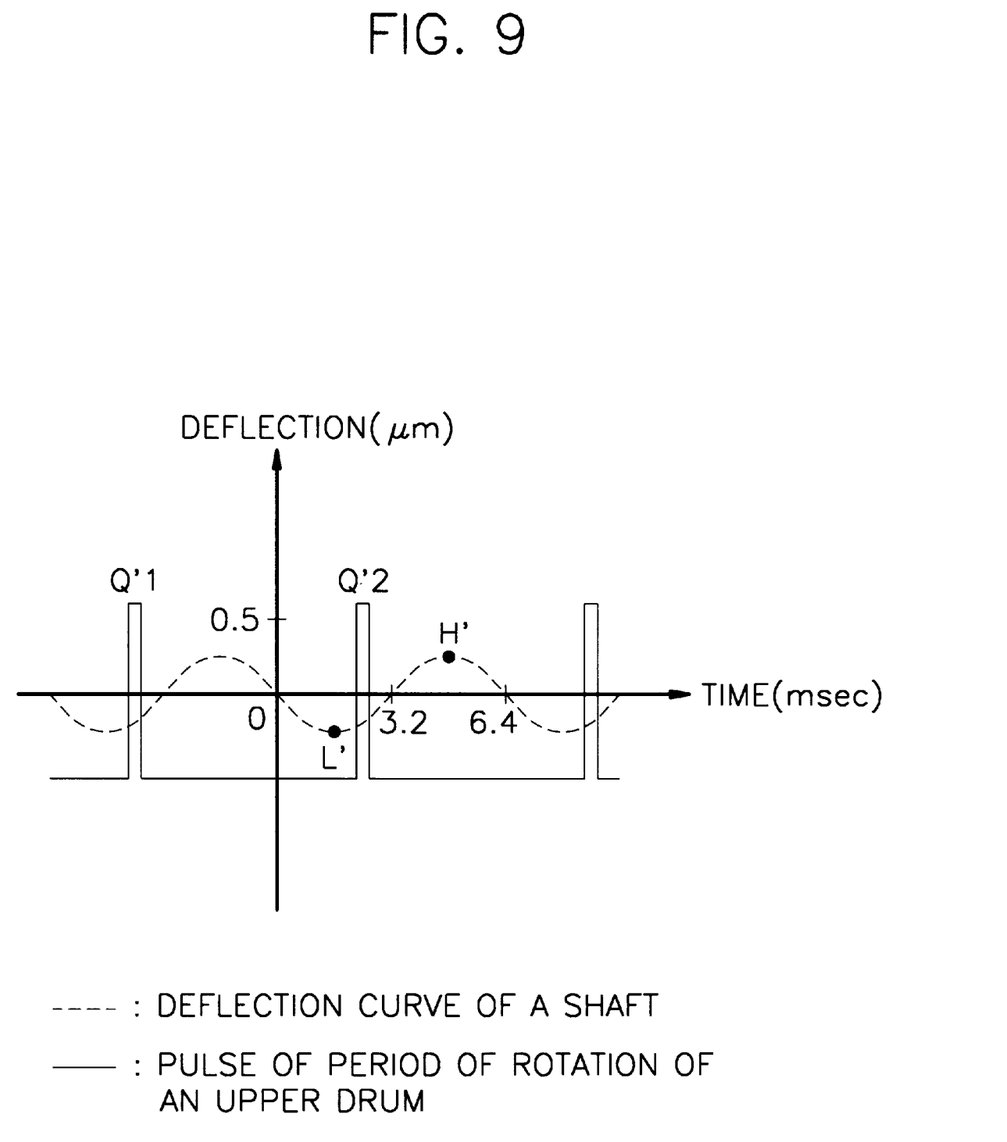
FIG. 9 is a graph for showing a deflection of the shaft according to one rotation period of an upper drum assembly which is balanced by the method for calculating an amount and determining a position of the eccentric mass according to an embodiment of the present invention.

FIG. 9 is a graph for showing a deflection of the shaft according to one rotation period of the upper drum assembly which is balanced by the method of calculating an amount and determining a position of the eccentric mass according to an embodiment of the present invention. The maximum and minimum deflections of the shaft in FIG. 9 are reduced by about a third of the maximum and minimum deflections of the shaft in FIG. 8.

Figure 10:
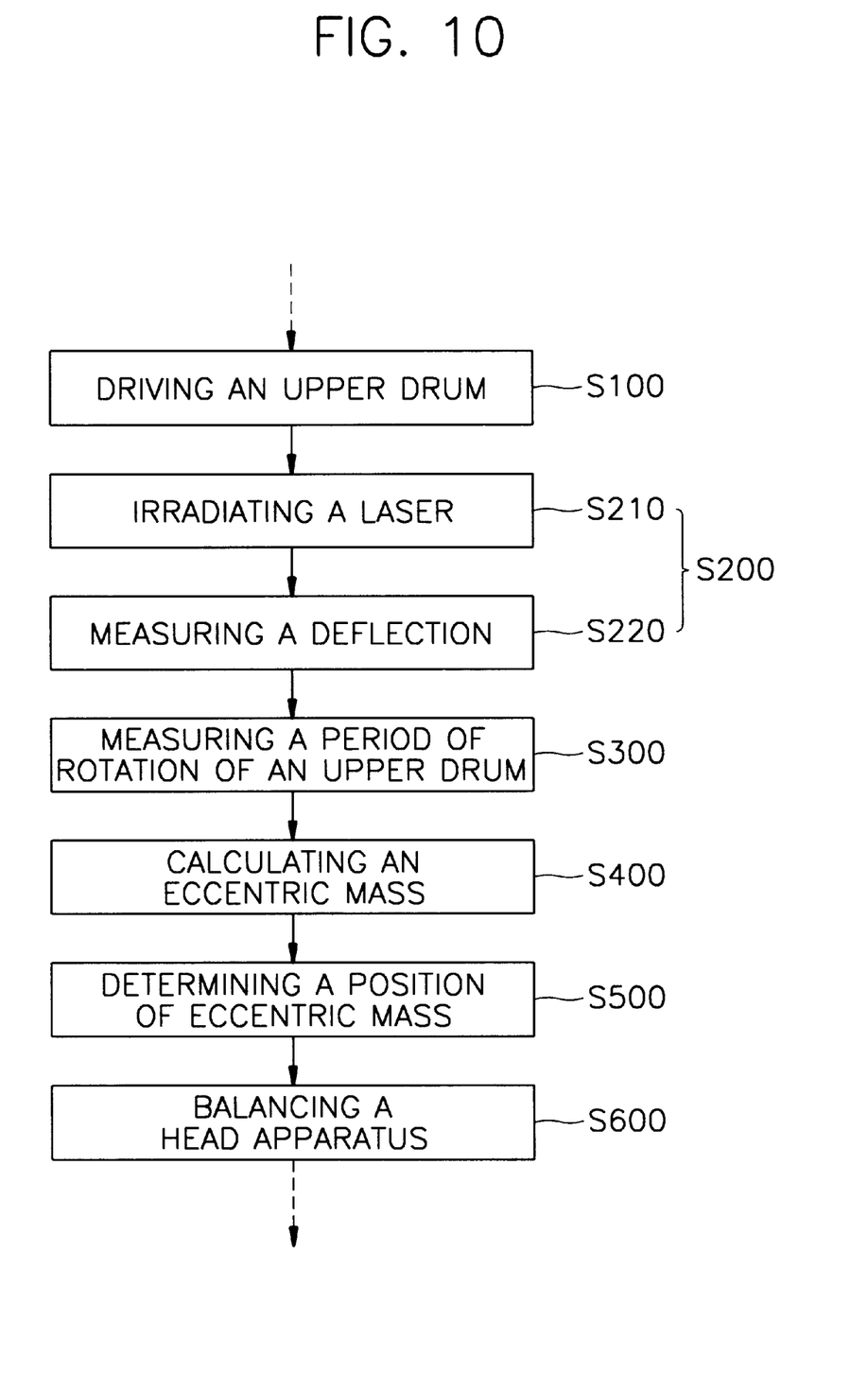
FIG. 10 is a flow chart for showing the method for calculating an amount and determining a position of the eccentric mass according to the embodiment of the present invention.

FIG. 10 is a flow chart for showing the method of calculating an amount and determining a position of the eccentric mass according to the embodiment of the present invention. This will be explained.

The upper drum assembly is rotated in a required velocity utilizing drive jig 310 at step S100. Then, the laser is irradiated onto shaft 220 extended to the upper portion of upper drum 210 to measure the deflection of shaft 220 by the eccentric mass of the upper drum assembly (step S200). At this time, step S200 includes step S210 for irradiating the laser onto shaft 220 and step S220 for measuring the deflection of shaft 220 utilizing the reflected laser from shaft 220. Step S210 and step S220 can be implemented separately or simultaneously. At step S300, sensing device 260 senses the period of rotation of the magnet 232 and transmits the period of rotation of the magnet 232 to drive jig 310. The drive jig 310 transmits a pulse signal which occurs in one rotation of the magnet 232 to the control system analyzer 300. At step S400, the calculation of the amount of the eccentric mass is implemented by substituting the measured deflection for equation (7). At step S500, the position of the eccentric mass of the upper drum 212 is determined by means of calculating the angle which is between the first point Q1 and the minimum deflection L or between the second point Q2 and the maximum deflection H. The calculated angle is the position of the eccentric mass of the upper drum 212. At step S600, the balancer M is attached to a position which is opposite to the position of the eccentric mass. Or, the calculated eccentric mass can be removed from the position of the eccentric mass of the upper drum. It is preferred that the mass of the balancer is less than 5 mmg.

As described above, the method and apparatus for calculating an amount and determining a position of the eccentric mass of the fixed shaft type rotary head apparatus according to the present invention, are very accurate and credible. Therefore, the rotational vibration of the head apparatus can be largely reduced through the balancing utilizing the calculated eccentric mass by the method and the apparatus according to the present invention.

Although the preferred embodiment of the invention has been described, it is understood that the present invention should not be limited to the preferred embodiment, but various changes and modifications can be made by one skilled in the art within the spirit and scope of the invention as hereinafter claimed.

What is claimed is:

1. A method for calculating an amount of an eccentric mass of a rotary head apparatus of a fixed shaft type having a drum including a fixed lower drum and a rotary upper drum, a shaft of which one end portion is fixed to said lower drum and of which other end portion is extended toward an outside of said upper drum, and a pair of first and second bearings which are installed on said shaft, support said upper drum, and rotate with said upper drum, comprising the steps of:

rotating said upper drum at a required velocity;

measuring a deflection of said shaft by said eccentric mass existing in said upper drum by means of an irradiation of a laser onto said extended portion of said shaft toward said outside of said upper drum and a reflection of said irradiated laser; and calculating said eccentric mass existing in said upper drum utilizing said measured deflection of said shaft, wherein said eccentric mass of said upper drum is calculated by the following equation of:

$$\delta = [m \cdot r \cdot \omega^2 (=P)/(6 \cdot E \cdot I \cdot (a-b))] \times [a^2 \cdot (c-b) \cdot (3 \cdot L - a) + b^2 \cdot (a-c) \cdot (3 \cdot L - b)]$$

wherein, δ=measured deflection of said shaft, P=centrifugal force of said eccentric mass of said upper drum, m=eccentric mass existing in said upper drum, r=distance from a center of said shaft to an end portion of said upper drum, ω=angular velocity of said upper drum, E=Young's modulus, I=second moment of inertia, a=distance from a fixed end of said shaft to said first bearing, b=distance from said fixed end of said shaft to said second bearing, c=distance from said fixed end of said shaft to an upper surface of said upper drum and L=length of said shaft.

2. An apparatus for calculating an amount of an eccentric mass of a rotary head apparatus of a fixed shaft type having a drum including a fixed lower drum and a rotary upper drum, a shaft of which one end portion is fixed to said lower drum and of which other end portion is extended toward an outside of said upper drum, and a pair of first and second bearings which are installed on said shaft, support said upper drum and rotate with said upper drum, said apparatus comprising:

a means for rotating said upper drum at a required velocity;

a means for measuring a deflection of said shaft by said eccentric mass existing in said upper drum by means of an irradiation of a laser onto said upper drum and a reflection of said irradiated laser; and a means for calculating said eccentric mass existing in said upper drum utilizing said measured deflection of said shaft, wherein said calculating means is the following equation of:

$$\delta=[m\cdot r\cdot\omega^2(=P)/(6\cdot E\cdot I\cdot(a-b))]\times[a^2\cdot(c-b)\cdot(3\cdot L-a)+b^2\cdot(a-c)\cdot(3\cdot L-b)]$$

wherein, $\delta$=measured deflection of said shaft, P=centrifugal force of said eccentric mass of said upper drum, m=eccentric mass existing in said upper drum, r=distance from a center of said shaft to an end portion of said upper drum, $\omega$=angular velocity of said upper drum, E=Young's Modulus, I=second moment of inertia, a=distance from a fixed end of said shaft to said first bearing, b=distance from said fixed end of said shaft to said second bearing, c=distance from said fixed end of said shaft to an upper surface of said upper drum and L=length of said shaft.

3. An apparatus for calculating an amount of an eccentric mass of a rotary head apparatus of a fixed shaft type as claimed in claim 2, wherein said rotating means is a drive jig.

4. An apparatus for calculating an amount of an eccentric mass of a rotary head apparatus of a fixed shaft type as claimed in claim 3, wherein said measuring means is a laser doppler vibrometer.

5. A method for determining a position of an eccentric mass of a rotary head apparatus of a fixed shaft type having a drum including a fixed lower drum and a rotary upper drum, a shaft of which one end portion is fixed to said lower drum and of which other end portion is extended toward an outside of said upper drum, a pair of first and second bearings which are installed on said shaft, support said upper drum and rotate with said upper drum, and a sensing device which is disposed in said upper drum, and senses a period of said rotation of said upper drum, comprising the steps of:

rotating, said upper drum at a required velocity;

measuring a deflection of said shaft by said eccentric mass existing in said upper drum by means of an irradiation of a laser onto said extended portion of said shaft toward said outside of said upper drum and a reflection of said irradiated laser; and measuring a period of rotation of said upper drum;

calculating said eccentric mass existing in said upper drum utilizing said measured deflection of said shaft; and determining a position of said eccentric mass existing in said upper drum utilizing said measured deflection of said shaft and said measured period of rotation of said upper drum, wherein said eccentric mass of said upper drum is calculated by the following equation of:

$$\delta=[m\cdot r\cdot\omega^2(=P)/(6\cdot E\cdot I\cdot(a-b))]\times[a^2\cdot(c-b)\cdot(3\cdot L-a)+b^2\cdot(a-c)\cdot(3\cdot L-b)]$$

wherein, $\delta$=measured deflection of said shaft, P=centrifugal force of said eccentric mass of said upper drum, m=eccentric mass existing in said upper drum, r=distance from a center of said shaft to an end portion of said upper drum, $\omega$=angular velocity of said upper drum, E=Young's modulus, I=second moment of inertia, a=distance from a fixed end of said shaft to said first bearing, b=distance from said fixed end of said shaft to said second bearing, c=distance from said fixed end of said shaft to an upper surface of said upper drum and L=length of said shaft.

6. A method for determining a position of an eccentric mass of a rotary head apparatus of a fixed shaft type as claimed in claim 5, wherein a maximum or a minimum deflection of said shaft is measured.

7. A method for determining a position of an eccentric mass of a rotary head apparatus of a fixed shaft type as claimed in claim 5, wherein said position of the eccentric mass is determined by means of said period of rotation of said upper drum which is sensed by said sensing device, and by means of a maximum or a minimum deflection of said shaft which occurs at each said one rotation of said upper drum.

8. An apparatus for determining a position of an eccentric mass of a rotary head apparatus of a fixed shaft type having a drum including a fixed lower drum and rotary upper drum, a shaft of which one end portion is fixed to said lower drum and of which other end portion is extended toward an outside of said upper drum, a pair of first and second bearings which are installed on said shaft, support said upper drum, and rotate with said upper drum, and a sensing device which is disposed in said upper drum, and senses a period of said rotation of said upper drum, said apparatus comprising:

a means for rotating said upper drum at a required velocity;

a means for measuring a deflection of said shaft by said eccentric mass existing in said upper drum by means of an irradiation of a laser onto said upper drum and a reflection of said irradiated laser;

a means for calculating said eccentric mass existing in said upper drum utilizing said measured deflection of said shaft;

a means for determining a position of said eccentric mass existing in said upper drum utilizing said measured deflection of said shaft and said measured period of rotation of said upper drum, wherein said calculating means is the following equation of:

$$\delta=[m\cdot r\cdot\omega^2(=P)/(6\cdot E\cdot I\cdot(a-b))]\times[a^2\cdot(c-b)\cdot(3\cdot L-a)+b^2\cdot(a-c)\cdot(3\cdot L-b)]$$

wherein, $\delta$=measured deflection of said shaft, P=centrifugal force of said eccentric mass of said upper drum, m=eccentric mass existing in said upper drum, r=distance from a center of said shaft to an end portion of said upper drum, $\omega$=angular velocity of said upper drum. E=Young's Modulus, I=second moment of inertia, a=distance from a fixed end of said shaft to said first bearing, b=distance from said fixed end of said shaft to said second bearing, c=distance from said fixed end of said shaft to an upper surface of said upper drum and L=length of said shaft.

9. An apparatus for determining a position of an eccentric mass of a rotary head apparatus of a fixed shaft type as claimed in claim 8, wherein said rotating means is a drive jig.

10. An apparatus for determining a position of an eccentric mass of a rotary head apparatus of a fixed shaft type as claimed in claim 9, said measuring means is a laser doppler vibrometer.

11. An apparatus for determining a position of an eccentric mass of a rotary head apparatus of a fixed shaft type as claimed in claim 8, wherein said determining means is an angle which is between a pulse signal and a maximum or a minimum deflection of said shaft which occurs every and each rotation of said upper drum.

* * * * *